United States Patent Office 3,420,856
Patented Jan. 7, 1969

3,420,856
SULFONATED 1-CYCLOHEXYLAMINO-4-ANILINO-ANTHRAQUINONES
François Bengueral, Basel, Switzerland, assignor to Sandoz Ltd. (also known as Sandoz A.G.), Basel, Switzerland
No Drawing. Filed Sept. 22, 1964, Ser. No. 398,393
Claims priority, application Switzerland, Sept. 24, 1963, 11,772/63; Aug. 11, 1964, 10,466/64
U.S. Cl. 260—374      6 Claims
Int. Cl. C09b 1/32; C09b 1/34

ABSTRACT OF THE DISCLOSURE

Water-soluble 1-anilino - 4-cyclohexylaminoanthraquinone dyes bearing a sulfonic acid group on the anilino nucleus produce dyeings on polyamide and wool which have excellent fastness properties.

---

This invention relates to water-soluble aminoanthraquinone dyes and to a process for their production. The new dyes correspond to the formula

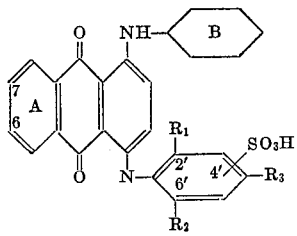

In this formula $R_1$ represents a low-molecular alkyl radical or a halogen atom, $R_2$ a low-molecular alkyl radical and $R_3$ a hydrogen atom or a low-molecular alkyl radical. The nucleus A may be substituted by halogen atoms and the cyclohexyl radical B, by alkyl radicals.

These new dyes are produced by the condensation of an anthraquinone derivative of the formula

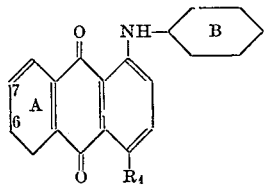

with a compound of the formula

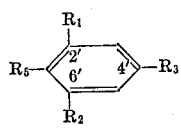

with cleavage of hydrogen halide, followed by sulfonation of the condensation product.

In Formula II $R_4$ represents a halogen atom or the primary amino group. In Formula III $R_5$ represents the primary amino group when $R_4$ stands for a halogen atom, or a halogen atom when $R_4$ stands for the primary amino group. When $R_5$ stands for a halogen atom, $R_1$ represents preferably a low-molecular alkyl radical. The preferred method of production is to employ a derivative of Formula II in which $R_4$ stands for the primary amino group and a compound of Formula III in which $R_5$ stands for a halogen atom; in this case $R_1$ denotes preferably a low-molecular alkyl radical.

A further method for the production of the aminoanthraquinone dyes of Formula I comprises halogenation in the 2'-position of a compound of formula

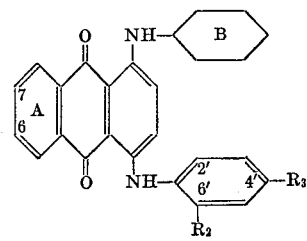

and sulfonation of the halogenated product.

The nucleus A in the anthraquinone derivative II is preferably unsubstituted, but it may be substituted by halogen atoms, preferably in the 6 and/or 7 positions. The cyclohexyl radical B may be unsubstituted or substituted by, e.g., alkyl radicals having 1 to 10 carbon atoms.

When compounds of Formula III are employed in which $R_5$ represents halogen, the positions 2', 4' and 6' are preferably occupied by low-molecular alkyl radicals, more especially methyl and/or ethyl radicals. When $R_5$ denotes the primary amino group, the nucleus of the compound of Formula III contains the aforenamed alkyl groups preferably in the 2'- and 6'-positions only. In all references to halogen atoms herein the preferred atoms are those of chlorine and bromine.

The condensation reaction with the compounds II and III, which takes place with cleavage of hydrogen halide, is conducted under the normal conditions. Generally, condensation is effected at an elevated temperature, i.e., above 100° C., and preferably in an inert solvent. Examples of suitable inert solvents are chlorinated and nitrated aromatic hydrocarbons. It is of advantage to condense in the presence of an acid-binding agent, such as sodium carbonate or pyridine, and of a catalyst, e.g., cupric chloride, other copper-I-compounds or copper-II-compounds or metallic copper. The dye formed can be isolated by filtration, preferably after accelerated crystallization with the aid of a suitable agent, such as an alcohol.

Finally, a sulfonic acid group is introduced by the normal method into the product that has been obtained by the reaction of a compound of Formula II and one of Formula III, or by halogenation of a compound of Formula IV. One sulphonic acid group gives the dyes very good level-dyeing properties on polyamide fabrics, especially synthetic polyamide fabrics of irregular affinity, but a second sulfonic acid group reduces level dyeing. Sulfonation is carried out preferably with cooling in the temperature range 0–25° C. using concentrated sulfuric acid containing small amounts of free sulfur trioxide. The sulfonation medium can be discharged on to ice and the dye isolated by filtration.

Halogenation, e.g., the bromination or chlorination of a compound of Formula IV, is carried out preferably in an inert solvent, e.g., chloroform, carbon tetrachloride or trichlorethylene, in the temperature range 0–30° C.

The resulting products are blue compounds readily soluble in water. They are especially suitable for the dyeing of polyamide fibers, e.g., synthetic polyamide fibers, in the form of filament, tow, tops, yarn, piece goods and knitted fabrics. The generic term "polyamide fibers" covers nylon 66, which is made from adipic acid and hexamethylene diamine, nylon 6 from adipic acid and ω-aminocaproic acid, nylon 610 from sebacic acid and hexamethylene diamine, and copolymers or mixtures of these; further, the polycondensation products of adipic or other dicarboxylic acids and diamines, or of higher-molecular aminocarboxylic acids, notably ω-aminoundecanoic acid; and finally polylactams, e.g., poly-ε-caprolactam or poly-ω-capryl lactam. The polyamide fiber produced with polypyrrolidone can also be dyed with the dyes of this invention.

The new dyes dye fabrics of polyamide fiber perfectly level, although these are often of irregular affinity and are normally dyed barry. The dyes are also suitable for wool dyeing. The dyeings have excellent fastness properties, in particular very good fastness to wet treatments, such as washing, milling, water, sea water, perspiration and soda boiling, and good rubbing and dry cleaning fastness. The light fastness is of similar excellence.

The parts and percentages in the examples are by weight and the temperatures in degrees centigrade.

EXAMPLE 1

A mixture of 32 parts of 1-amino-4-cyclohexylaminoanthraquinone, 30 parts of 1-bromo-2,4,6-trimethylbenzene, 70 parts of nitrobenzene, 8.5 parts of sodium carbonate and 0.2 part of cuprous chloride is heated for 32 hours at 140°. The reaction product, 1-(2',4',6'-trimethylphenylamino)-4-cyclohexylaminoanthraquinone, is precipitated by the addition of methanol.

10 parts of this product are sulfonated in 50 parts of 10% oleum at 10–15°. On completion of sulfonation, the mass is run on to ice, the reaction product is filtered off and washed with 10% sodium chloride solution until of neutral reaction. A blue dye in powder form is obtained which dyes wool, nylon and other polyamide fibers—including polyamide materials which normally dye barry—in level blue shades having good light and wet fastness.

EXAMPLE 2

A mixture of 32 parts of 1-amino-4-cyclohexylaminoanthraquinone, 44 parts of 1-bromo-2,4,6-triethylbenzene, 70 parts of nitrobenzene, 8.5 parts of sodium carbonate and 0.2 part of cuprous chloride is heated at 145° for 48 hours. The reaction yields 1-(2',4',6'-triethylphenylamino)-4-cyclohexylaminoanthraquinone, which is precipitated with ethanol.

10 parts of this product are dissolved in 80 parts of 96% sulfuric acid at 0–2°, and 38 parts of 25% oleum are added to the solution at the same temperature. When sulfonation is complete, the mass is poured on to ice, the reaction product filtered off and washed with 10% aqueous solution of sodium chloride. A blue dye in powder form is obtained which dyes wool and polyamide fibers, including those of irregular affinity, in level light blue shades of good light and wet fastness.

EXAMPLE 3

A mixture of 32 parts of 1-amino-4-cyclohexylaminoanthraquinone, 44 parts of 1-bromo-2,4-diethyl-6-methylbenzene, 70 parts of nitrobenzene, 8.5 parts of sodium carbonate and 0.2 part of cuprous chloride is heated at 140° for 42 hours. The base thus formed is isolated and sulfonated to give a blue dye in powder form which dyes wool and polyamide fibres, particularly those that normally dye barry, in level blue shades that have good light and wet fastness properties.

EXAMPLE 4

A mixture of 39 parts of 1-cyclohexylamino-4-bromoanthraquinone, 88 parts of 2,4,6-triethyl-1-aminobenzene, 12 parts of sodium acetate and 0.3 part of cuprous chloride is heated at 135° for 50 hours. The dye base formed is isolated and sulfonated, on which a dye is obtained having the same dyeing and fastness properties as that described in Example 2.

Further valuable aminoanthraquinone dyes which can be produced in accordance with Example 1 to 4 are set out in the following table. These dyes have the formula

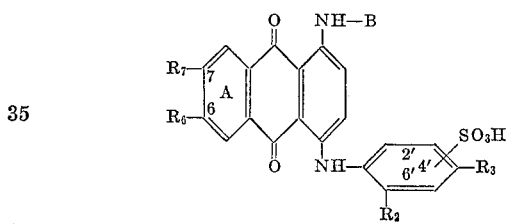

in which B, $R_1$, $R_2$, $R_3$, $R_6$ and $R_7$ have the meanings assigned to them in the table. The shade of the dyeing on nylon is noted in the final column.

| Ex. | $R_1$ | $R_2$ | $R_3$ | $R_6$ | $R_7$ | B | Shade of Dyeing on Nylon |
|---|---|---|---|---|---|---|---|
| 5 | $CH_3$ | $C_2H_5$ | $CH_3$ | H | H | —⟨H⟩ | Blue. |
| 6 | $CH_3$ | $CH_3$ | H | H | H | —⟨H⟩ | Do. |
| 7 | $CH_3$ | $CH_3$ | $C_2H_5$ | H | H | —⟨H⟩ | Do. |
| 8 | $CH_3$ | $CH_3$ | tert.-$C_4H_9$ | H | H | —⟨H⟩ | Do. |
| 9 | $CH_3$ | tert.-$C_4H_9$ | tert.-$C_4H_9$ | H | H | —⟨H⟩ | Do. |
| 10 | $CH_3$ | $CH_3$ | $CH_3$ | H | H | $CH_3$ —⟨H⟩ | Do. |
| 11 | $CH_3$ | $CH_3$ | $CH_3$ | Cl | Cl | —⟨H⟩ | Greenish blue. |
| 12 | $CH_3$ | $CH_3$ | H | Cl | Cl | —⟨H⟩ | Do. |
| 13 | $CH_3$ | $CH_3$ | $CH_3$ | Br | Br | —⟨H⟩ | Do. |

| Ex. | $R_1$ | $R_2$ | $R_3$ | $R_4$ | $R_7$ | B | Shade of Dyeing on Nylon |
|---|---|---|---|---|---|---|---|
| 14 | $CH_3$ | $CH_3$ | H | Br | Br |  | Do. |
| 15 | Cl | $CH_3$ | $CH_3$ | H | H |  | Blue. |
| 16 | Cl | $CH_3$ | tert.-$C_4H_9$ | H | H |  | Do. |
| 17 | Br | $CH_3$ | $CH_3$ | H | H |  | Do. |
| 18 | Br | $C_2H_5$ | $CH_3$ | H | H |  | Do. |
| 19 | Br | $CH_3$ | tert.-$C_4H_9$ | H | H |  | Do. |
| 20 | Br | $CH_3$ | tert.-$C_4H_9$ | Cl | Cl |  | Greenish blue. |
| 21 | $CH_3$ | $CH_3$ | $CH_3$ | H | H |  | Blue. |
| 22 | Br | $C_2H_5$ | $CH_3$ | H | H |  | Do. |
| 23 | $CH_3$ | $CH_3$ | $C_2H_5$ | Cl | Cl |  | Greenish blue. |
| 24 | $C_2H_5$ | $C_2H_5$ | $C_2H_5$ | H | H |  | Blue. |
| 25 | Br | $CH_3$ | tert.-$C_4H_9$ | H | H |  | Do. |
| 26 | $CH_3$ | $C_2H_5$ | $C_2H_5$ | Cl | Cl |  | Greenish blue. |
| 27 | $CH_3$ | $CH_3$ | $CH_3$ | H | H | —tert.-$C_5H_{11}$ | Blue. |
| 28 | $CH_3$ | $CH_3$ | $CH_3$ | H | H | —tert.-$C_4H_9$ | Do. |
| 29 | $C_2H_5$ | $C_2H_5$ | $C_2H_5$ | H | H | —$CH_3$ | Do. |
| 30 | Cl | $CH_3$ | tert.-$C_4H_9$ | H | H | 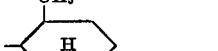—iso-$C_8H_{17}$ | Do. |
| 31 | Br | $CH_3$ | $CH_3$ | H | H | —tert.-$C_4H_9$ | Do. |
| 32 | Br | $CH_3$ | $CH_3$ | H | H | 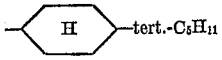—$C_6H_{13}$ | Do. |
| 33 | $C_2H_5$ | $CH_3$ | $CH_3$ | H | H | 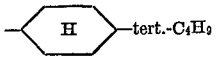—$C_{10}H_{21}$ | Do. |
| 34 | $CH_3$ | $CH_3$ | H | Cl | Cl | 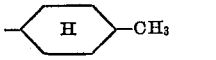—$CH_3$ | Greenish blue. |

EXAMPLE 35

A mixture of 32 parts of 1-amino-4-cyclohexylamino-anthraquinone, 28 parts of 4,6-dimethyl-1-bromobenzene, 70 parts of nitrobenzene, 8.5 parts of sodium carbonate and 0.2 part of cuprous chloride is heated at 140° for 32 hours. The 1-(4',6'-dimethylphenylamino)-4-cyclohexylaminoanthraquinone formed by the reaction is precipitated with methanol, isolated, dissolved in 150 parts of chloroform and reacted with 16 parts of bromine. 10 parts of the resulting 1-(4',6'-dimethyl-2'-bromophenyl-amino)-4-cyclohexylaminoanthraquinone are sulfonated in 50 parts of 10% oleum at 10–15°. On completion of sulfonation the mass is run on to ice, the reaction product filtered off and washed with a 10% aqueous solution of sodium chloride until of neutral reaction. A blue dye in powder form is obtained which dyes wool and polyamide fiber materials of regular or irregular affinity in level blue shades of good light and wet fastness.

Example A.—Dyeing

A dyebath is set with 2 parts of the dye of Example 1, 10 parts of Glauber's salt, 2 parts of glacial acetic acid and 10,000 parts of water. 100 parts of nylon fabric of irregular affinity, i.e., "barry dyeing," are entered into the bath at 40–50°. The bath is brought to the boil in 30 minutes and held at the boil for 30 minutes, after which time 2 parts of glacial acetic acid are added and dyeing continued for a further 30 minutes at the boil. The nylon fabric is rinsed and dried. It is dyed in a very bright blue shade showing very good fastness to light and to wet treatments such as washing, acid and alkaline milling, water, sea water, perspiration and rubbing. The dyeing is perfectly level and free from barriness.

Formulae of representatives dyes of the foregoing examples are as follows:

Example 1

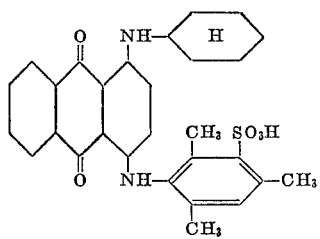

Example 2

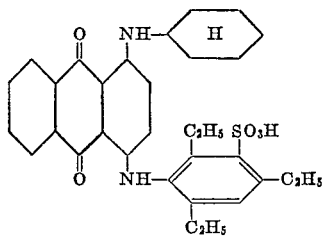

Example 3

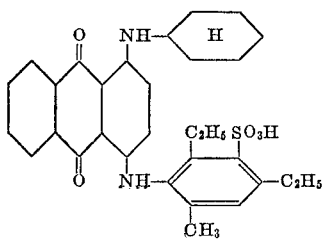

Example 5

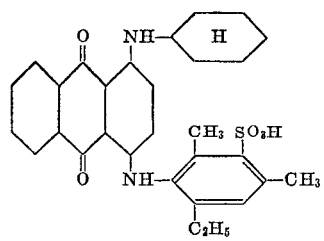

Example 27

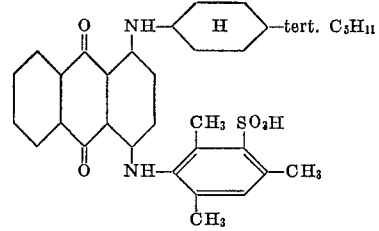

Having thus disclosed the invention what I claim is:

1. A water-soluble aminoanthraquinone dye of the formula

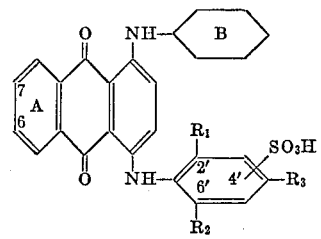

(I)

wherein $R_1$ is a member selected from the group consisting of lower alkyl and halo, $R_2$ is lower alkyl, $R_3$ is a member selected from the group consisting of hydrogen and lower alkyl, and in which the nucleus A is either halo-substituted in at least one of the 6- and the 7-positions or is unsubstituted and the cyclohexyl radical B is either unsubstituted or is substituted in at least one of the 2-, 4- and 6-positions with alkyl having 1 to 10 carbon atoms.

2. The water-soluble aminoanthraquinone dye of the formula

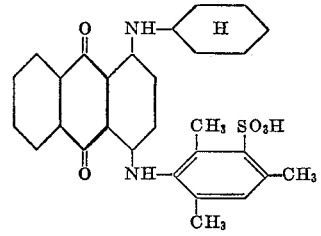

3. The water-soluble aminoanthraquinone dye of the formula

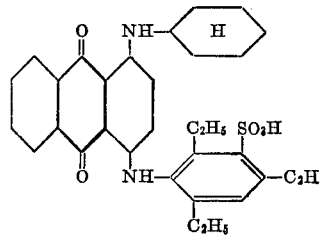

4. The water-soluble aminoanthraquinone dye of the formula
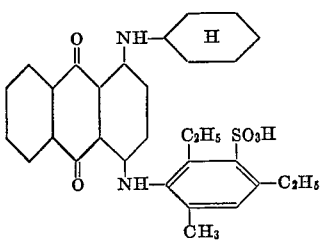
5. The water-soluble aminoanthraquinone dye of the formula
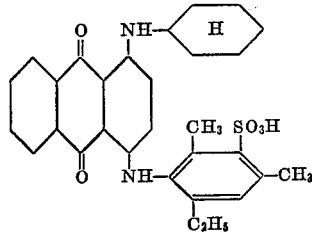
6. The water-soluble aminoanthraquinone dye of the formula
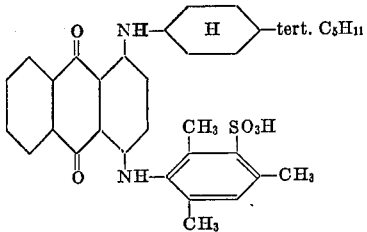
References Cited
UNITED STATES PATENTS
1,821,043  9/1931  Weinand _____ 260—371
FOREIGN PATENTS
733,458  7/1955  Great Britain.
JAMES A. PATTEN, *Primary Examiner.*
H. C. WEGNER, *Assistant Examiner.*
U.S. Cl. X.R.
8—39, 54, 55

PO-1050
(5/69)

UNITED STATES PATENT OFFICE
CERTIFICATE OF CORRECTION

Patent No. 3,420,856                           Dated January 7, 1969

Inventor(s) Francois Benguerel

It is certified that error appears in the above-identified patent and that said Letters Patent are hereby corrected as shown below:

Column 1, line 4, correct "Benguerel"; line 30, in formula (I), "N-" should read --NH- --; line 45, in formula (II), correct " 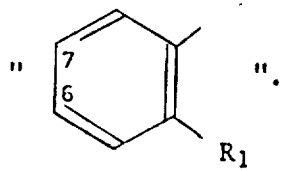 ".

Column 2, line 57, "e.g.," should read --e.g.--. Column 4, line 35, in the formula, correct " 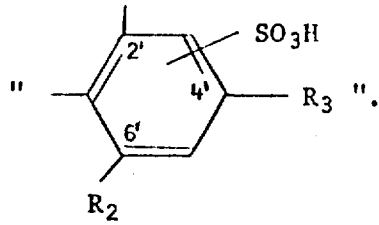 ".

Column 7, line 32, after "treatments" insert a comma --,--. Claim 3, in the formula "$C_2H$" should read --$C_2H_5$--.

SIGNED AND
SEALED

MAR 3 - 1970

(SEAL)
Attest:

Edward M. Fletcher, Jr.
Attesting Officer

WILLIAM E. SCHUYLER, J
Commissioner of Patent